United States Patent
Yamaguchi et al.

(10) Patent No.: US 9,536,648 B2
(45) Date of Patent: Jan. 3, 2017

(54) CORE FOR WIRE-WOUND COMPONENT AND MANUFACTURING METHOD THEREOF AND WIRE-WOUND COMPONENT MADE THEREWITH

(75) Inventors: Takashi Yamaguchi, Takasaki (JP); Takanori Yoshizawa, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 282 days.

(21) Appl. No.: 13/558,180

(22) Filed: Jul. 25, 2012

(65) Prior Publication Data

US 2013/0186995 A1    Jul. 25, 2013

(30) Foreign Application Priority Data

Aug. 2, 2011  (JP) .................................. 2011-169655

(51) Int. Cl.
*H01F 5/02* (2006.01)
*B23P 13/00* (2006.01)
(Continued)

(52) U.S. Cl.
CPC ................ *H01F 5/02* (2013.01); *B23P 13/00* (2013.01); *B65H 75/18* (2013.01); *H01F 17/045* (2013.01);
(Continued)

(58) Field of Classification Search
CPC ..... B65H 75/02; B65H 75/18; B65H 2701/53; B65H 2701/534; H01F 5/02; H01F 17/045; H01F 27/24
(Continued)

(56) References Cited

U.S. PATENT DOCUMENTS 3,432,116 A * 3/1969 Lauen et al. ................ 242/118.7
3,851,830 A * 12/1974 Barthalon ..................... 336/208
(Continued)

FOREIGN PATENT DOCUMENTS

JP   H03-097912 U   10/1991
JP   H11-054329 A   2/1999
(Continued)

OTHER PUBLICATIONS

Notice of Reasons for Refusal issued by Korean Patent Office, mailed on Jun. 18, 2013, for Korean counterpart application No. 10-2012-0072959.
(Continued)

*Primary Examiner* — Emmanuel M Marcelo
*Assistant Examiner* — Justin Stefanon
(74) *Attorney, Agent, or Firm* — Law Office of Katsuhiro Arai (57) ABSTRACT

A drum core for a wire-wound component having a pair of flange parts provided on both ends of an axis core around which a winding wire is wound, with tapered surfaces of roughly conical shape formed on their facing inner surfaces in such a way that the interval of the inner surfaces increases toward the outer sides of the flange parts. The flange parts have roughly a rectangular shape and the sides along which their long side faces contact the tapered surfaces have the curved shapes that convex roughly at the center. The curved shapes make the height of the corners of the flange parts from the reference surface lower than the height of the convex parts of the curved shapes from the reference surface, and the loads received by the wire during winding are reduced as a result.

14 Claims, 6 Drawing Sheets

(51) Int. Cl.
  *B65H 75/18* (2006.01)
  *H01F 17/04* (2006.01)
  *H01F 27/29* (2006.01)

(52) U.S. Cl.
  CPC ........ *H01F 27/292* (2013.01); *Y10T 29/49995* (2015.01)

(58) Field of Classification Search
  USPC .................. 242/613, 613.1, 614, 118, 118.4, 608, 242/608.8, 610.6
  See application file for complete search history.

(56) References Cited

U.S. PATENT DOCUMENTS

| | | | | |
|---|---|---|---|---|
| 3,989,200 | A * | 11/1976 | Bachi | 242/437.3 |
| 4,253,569 | A * | 3/1981 | O'Connor et al. | 206/391 |
| 4,424,504 | A * | 1/1984 | Mitsui et al. | 336/83 |
| 4,493,462 | A * | 1/1985 | Ditton | 242/118.61 |
| 4,549,158 | A * | 10/1985 | Mitsui et al. | 336/83 |
| 5,175,525 | A * | 12/1992 | Smith | 336/83 |
| 5,718,397 | A * | 2/1998 | Stevens | 242/608.8 |
| 6,055,720 | A * | 5/2000 | Finn et al. | 29/605 |
| 6,087,920 | A * | 7/2000 | Abramov | 336/192 |
| 6,114,932 | A * | 9/2000 | Wester et al. | 336/65 |
| 6,344,784 | B1 * | 2/2002 | Murata et al. | 336/83 |
| 6,501,362 | B1 * | 12/2002 | Hoffman et al. | 336/198 |
| 6,525,635 | B2 * | 2/2003 | Murata et al. | 336/83 |
| 6,583,697 | B2 * | 6/2003 | Koyama et al. | 336/83 |
| 6,774,755 | B2 * | 8/2004 | Nakata et al. | 336/83 |
| 6,879,235 | B2 * | 4/2005 | Ichikawa | 336/200 |
| 7,168,646 | B2 * | 1/2007 | Gregory | B65H 54/12 242/118.32 |
| 7,358,842 | B1 * | 4/2008 | Liu | H01F 17/045 336/200 |
| 7,661,623 | B2 * | 2/2010 | Peng et al. | 242/587.2 |
| 8,164,409 | B2 * | 4/2012 | Kudo | H01F 17/045 336/208 |
| 2010/0109827 | A1 * | 5/2010 | Asou | H01F 17/045 336/192 |
| 2010/0308950 | A1 * | 12/2010 | Hsieh | H01F 3/10 336/221 |
| 2011/0050378 | A1 * | 3/2011 | Kobayashi et al. | 336/192 |
| 2014/0139313 | A1 * | 5/2014 | Zhou et al. | 336/84 C |

FOREIGN PATENT DOCUMENTS

| | | |
|---|---|---|
| JP | 2005-251933 A | 9/2005 |
| JP | 2008-205245 A | 9/2008 |
| JP | 2010-016217 A | 1/2010 |
| KR | 10-2000-0071002 A | 11/2000 |

OTHER PUBLICATIONS

Notice of Reasons for Refusal issued by Japanese Patent Office, mailed on Jul. 9, 2013, for Japanese counterpart application No. 2011-169655.

A Notification of First Office Action with Search Report issued by the State Intellectual Property Office of China, mailed May 20, 2014, for Chinese counterpart application No. 201210272193.7.

* cited by examiner

CORE FOR WIRE-WOUND COMPONENT AND MANUFACTURING METHOD THEREOF AND WIRE-WOUND COMPONENT MADE THEREWITH

BACKGROUND

Field of the Invention

The present invention relates to a core for a wire-wound component constituted by a winding wire-wound around an axis core having flange parts on both ends, its manufacturing method, and a wire-wound component, and more specifically to a prevention of damage of winding wire and adjustment of wire winding position.

Description of the Related Art

Traditionally a drum core for a wound inductor of low-height shape having a pair of square flange parts on both ends of its axis core is subject to wire damage when the ridgelines on the inner sides of the corners of the flange corners contact the winding wire when winding. Accordingly, there has been a need to improve the reliability of the product by facilitating position adjustment at the time of winding. To address this problem, a wire-wound coil component is disclosed in Patent Literature 1 mentioned below, for example, wherein the winding core has a tapered part at both ends of the winding core in such a way that the wire-wound part becomes thicker toward each end, while the coil winding wire is made of a square wire having a square section shape, so that when the coil winding wire is wound around the tapered part in a manner causing the tapered part of the winding core to make surface contact, strength of the winding core can be increased without decreasing the number of windings of the coil winding wire and consequently winding of the coil winding wire becomes easy. Also, Patent Literature 2 mentioned below discloses a surface mount choke coil utilizing a drum core having an enlargement area, wherein, specifically, a tapered part is formed on the surface of at least one of the upper flange part and lower flange part provided on both ends of the winding core, where said surface is facing the other flange part, so that when the outer periphery surface of the coil conductor wound around the winding core moves away in the radius direction, the interval between the facing flange parts becomes larger.

PRIOR ART LITERATURES

Patent Literatures

[Patent Literature 1] Japanese Patent Laid-open No. 2005-251933
[Patent Literature 2] Japanese Patent Laid-open No. 2008-205245

SUMMARY

Both of the prior arts in Patent Literature 1 and Patent Literature 2 described above may, however, cause the wire to be caught by or ride over the flange parts in the process of winding the wire (winding wire), resulting in wire damage. This is why, with a square inductor drum core formed with an axis core and a pair of flange parts provided on both ends of the axis core, the winding tension and angle at which to draw out the winding wire must be adjusted optimally to prevent the wire from being damaged during winding. However, the allowable setting width is limited, and adjusting them is difficult. In general, the winding wire is traversed and aligned. With this method, however, winding of the winding wire may still be disturbed.

The present invention focuses on the points mentioned above, and thus its object is to provide a core for a wire-wound component having minimum winding disturbance and offering high reliability that reduces the loads received by the wire during winding by allowing for optimal adjustment of the winding tension of the winding wire and angle at which to draw out the winding wire, as well as a manufacturing method of said core. Another object is to provide a wire-wound component that uses the aforementioned core for a wire-wound component.

Any discussion of problems and solutions involved in the related art has been included in this disclosure solely for the purposes of providing a context for the present invention, and should not be taken as an admission that any or all of the discussion were known at the time the invention was made.

The core for a wire-wound component proposed by the present invention is a core for a wire-wound component having an axis core around which a winding wire is wound, as well as a pair of flange parts provided on both ends of the axis core, wherein said core is characterized in that tapered parts are provided on the facing inner surfaces of the pair of flange parts in such a way that the interval of the facing inner surfaces increases toward the outer sides of the flange parts, while at least one flange part has a polygonal shape in plan view as seen from the axial direction of the axis core and the side along which at least one side face of the polygonal flange part contacts the tapered surface has a curved shape that convexes roughly at the center.

One main embodiment is characterized in that when the tapered surface has a rough conical shape, the side along which the tapered surface contacts the side face of the polygonal flange part has the curved shape. Another embodiment is characterized in that the angle of the tapered surface relative to the surface crossing at right angles with the axial direction of the axis core is 3° to 40°. Yet another embodiment is characterized in that a notched part from which to draw out the winding wire is provided at a corner of the flange part.

The manufacturing method of the core for a wire-wound component proposed by the present invention is a manufacturing method of a core for a wire-wound component having an axis core (which is also referred to as a "winding core") around which a winding wire is wound, as well as a pair of flange parts provided on both ends of the axis core, wherein said manufacturing method is characterized in that it includes: a step to cut a core material to form the axis core and pair of flange parts by causing a wheel with tapered surfaces formed at the edges on both of its main sides to turn together with the core material to perform cutting in such a way as to form, on the facing inner surface sides of the pair of flange parts, tapered surfaces of roughly conical shape that allow the interval of the facing inner surfaces to increase toward the outer sides of the flange parts; and a step to cut at least a part near the outer side of at least one flange part, in parallel with the axis core and by making the cut part cross with the tapered surface, in such a way that the side along which the cut section contacts the tapered surface has a curved shape that convexes roughly at the center.

Another manufacturing method of the core for wire-wound component proposed by the present invention is a manufacturing method of a core for a wire-wound component having an axis core around which a winding wire is wound, as well as a pair of flange parts provided on both ends of the axis core, wherein said manufacturing method is characterized in that a core material is provided that makes at least one of the pair of flange parts polygonal as seen from the axial direction of the axis core, and the core material is cut to form the axis core and pair of flange parts by causing a wheel with tapered surfaces formed at the edges on both of its main sides to turn together with the core material to perform cutting in such a way as to form, on the facing inner surface sides of the pair of flange parts, tapered surfaces of roughly conical shape that allow the interval of the facing inner surfaces to increase toward the outer sides of the flange parts, while at the same time shaping each of said tapered surfaces until it crosses with at least one side face of the polygonal flange part so that the side along which the side face of the flange part contacts the tapered surface has a curved shape that convexes roughly at the center.

The core for a wire-wound component also proposed by the present invention is characterized in that it is manufactured by one of the manufacturing methods mentioned above. The wire-wound component proposed by the present invention is characterized in that a winding wire is wound around the axis core of any of the cores for a wire-wound component mentioned above to form a conductor part, and the winding wire is drawn out from near the corner of the flange part having the curved shape, so as to create a structure where the end of the winding wire is connected to an electrode formed on the outer surface of the flange part. One main embodiment is characterized in that an outer sheath is formed on the winding wire. The aforementioned and other objects, characteristics and benefits of the present invention are made clear through the detailed explanation below as well as the attached drawings.

According to the present invention, with respect to a core for a wire-wound component having an axis core around which a winding wire is wound, as well as a pair of flange parts provided on both ends of the axis core, tapered surfaces are provided on the facing inner surfaces of the pair of flange parts to make the interval of the facing inner surfaces increase toward the outer sides of the flange parts, while at least one flange part has a polygonal shape as seen from the axial direction of the axis core and is shaped in such a way that the side along which at least one side face of the polygonal flange part contacts the tapered surface has a curved shape that convexes roughly at the center and that the height of the end of the curved shape from the reference surface at the corner of the flange part is lower than that of the convex part of the curved shape from the reference surface. This makes it easy to optimally adjust the angle at which to draw out the winding wire and tension of the winding wire, which reduces the loads received by the wire during winding, thereby achieving a reliable core with minimum winding disturbance. Also, making the core in a drum shape having the aforementioned characteristics has the effect of causing the flange parts of cores, when contacting each other, to make only point contact without meshing and locking with each other.

For purposes of summarizing aspects of the invention and the advantages achieved over the related art, certain objects and advantages of the invention are described in this disclosure. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Further aspects, features and advantages of this invention will become apparent from the detailed description which follows.

BRIEF DESCRIPTION OF THE DRAWINGS

These and other features of this invention will now be described with reference to the drawings of preferred embodiments which are intended to illustrate and not to limit the invention. The drawings are greatly simplified for illustrative purposes and are not necessarily to scale.

DESCRIPTION OF THE SYMBOLS

10: Drum core
12: Axis core
14, 24: Flange part
14A to 14D, 24A to 24D: Side face
15, 25: Corner
16, 26: Inner surface
18, 28: Tapered surface
20A, 20B, 30A, 30B: Curved shape
40: Winding wire
40A, 40B: Draw-out part
50: Drum core
52: Axis core
54, 58: Flange part
56, 60: Tapered surface
62: Corner
100: Drum core
102: Axis core
104, 114: Flange part
106, 116: Side face
108, 118: Tapered surface
110, 120: Corner 112, 122: Curved shape
200: Drum core
202: Axis core
204, 214: Flange part
204A to 204D, 214A to 214D: Side face
206, 216: Inner surface
208, 218: Tapered surface
210, 220: Notched part
212, 222: Corner
215, 224: Curved shape
300: Drum core
302: Axis core
304, 314, 314': Flange part
304A to 304H, 314A to 314D: Side face
306: Tapered surface
312, 322: Corner
308A to 308H, 324A to 324D: Curved shape
316: Inner surface
318: Tapered surface
320A to 320D: Notched part
326A, 326B: Groove
330, 332: Shaft
340: Diamond wheel
340A, 340B: Main side
340C: Edge
342A, 342B: Tapered surface
350A, 350B: Electrode
360: Outer sheath
370: Core material
372: Octagonal part
374: Square part
380: Machined work
400: Wire-wound component
T1 to T10: Height

DETAILED DESCRIPTION OF EMBODIMENTS

The embodiments of the invention are explained in detail using examples.

Example 1

Figure 1:
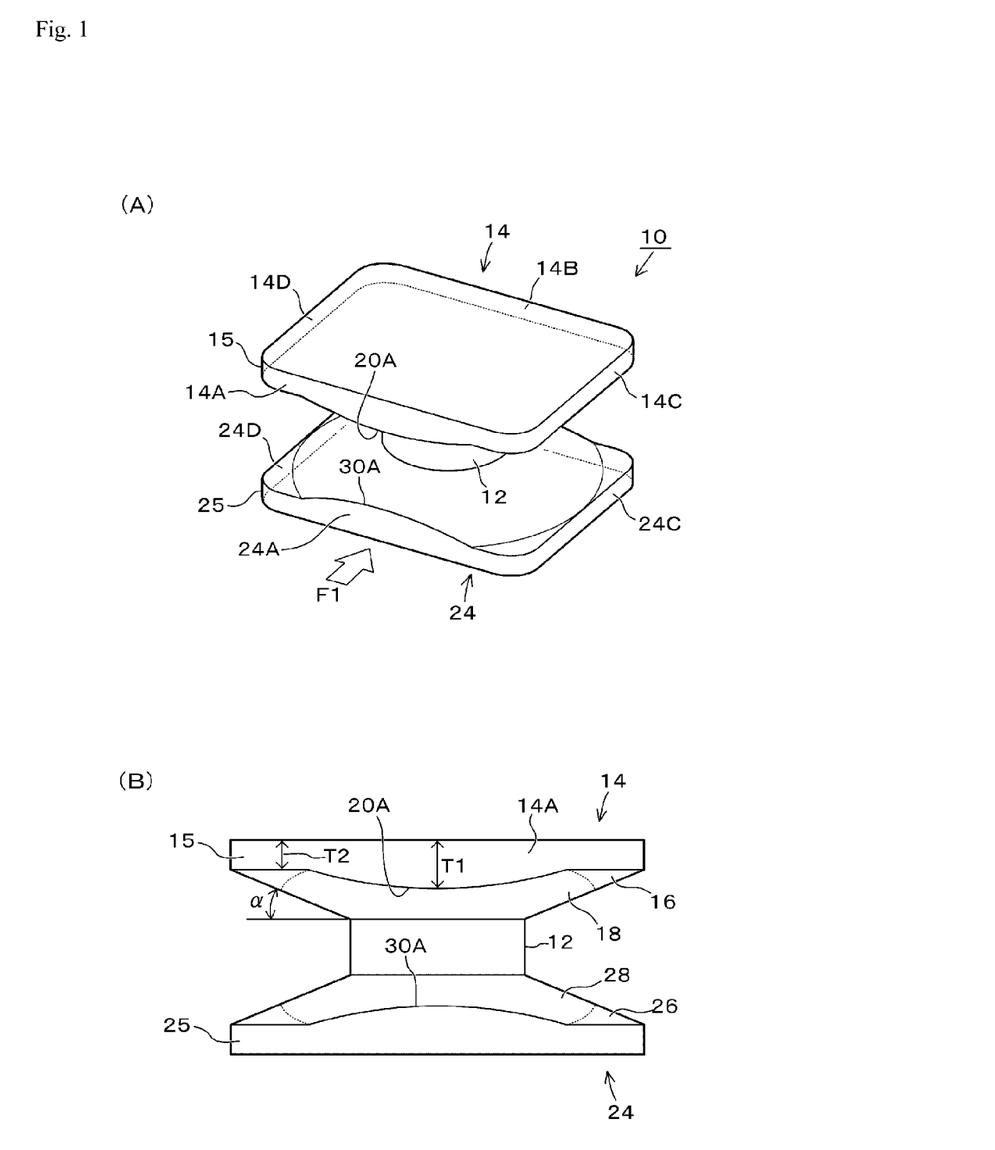
FIG. 1 represents Example 1 of the present invention, where (A) is an exterior perspective view of the drum core, while (B) is a side view of (A) from the direction of arrow F1.
Figure 2:
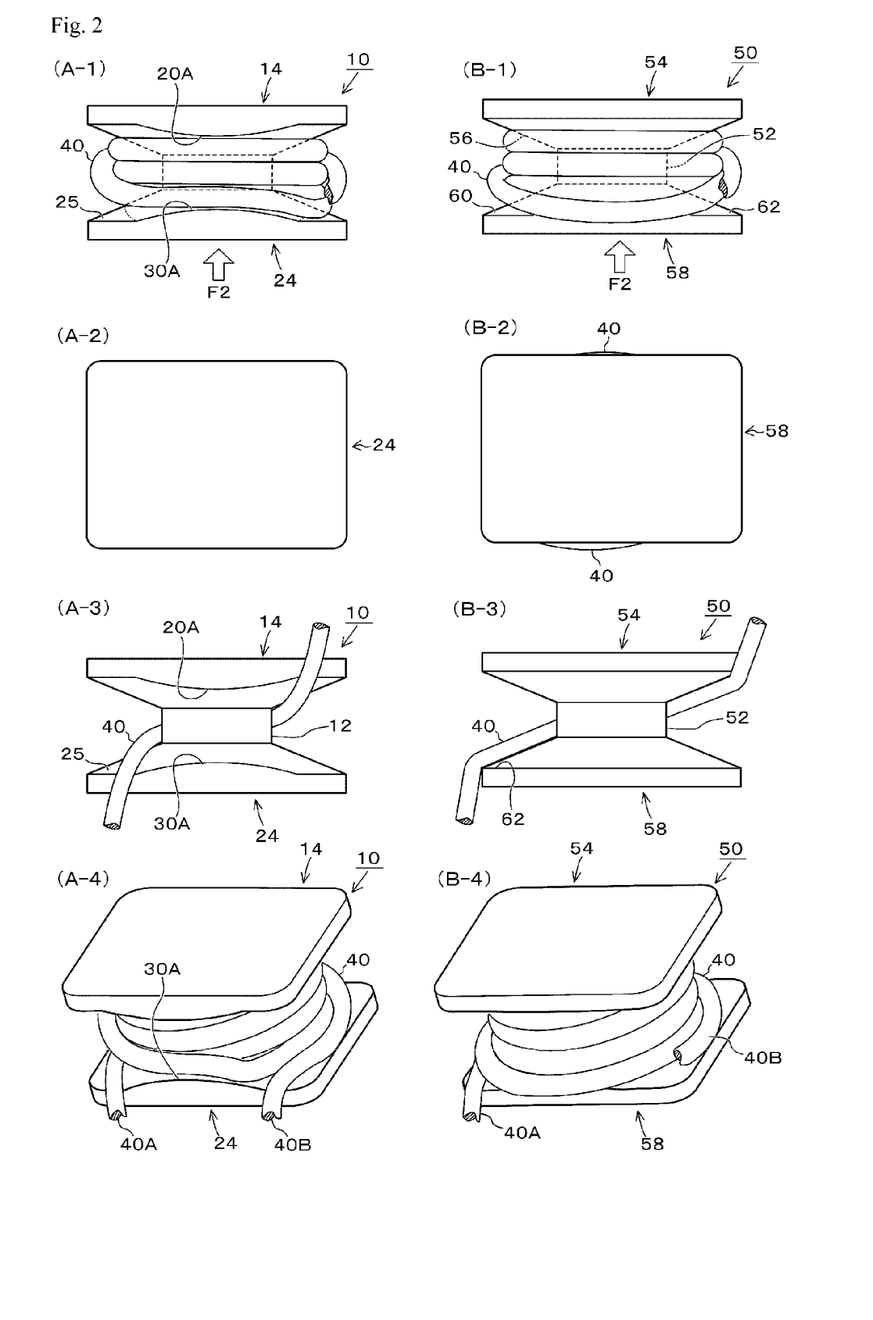
FIG. 2 illustrates side views ((A-1), (A-3), (B-1), and (B-3)), bottom views ((A-2) and (B-2)), and perspective views ((A-4) and (B-4)) showing the conditions of Example 1 ((A-1), (A-2), (A-3), and (A-4)) and a comparative example ((B-1), (B-2), (B-3), and (B-4)) where the winding wire is wound around the drum core.
Figure 3:
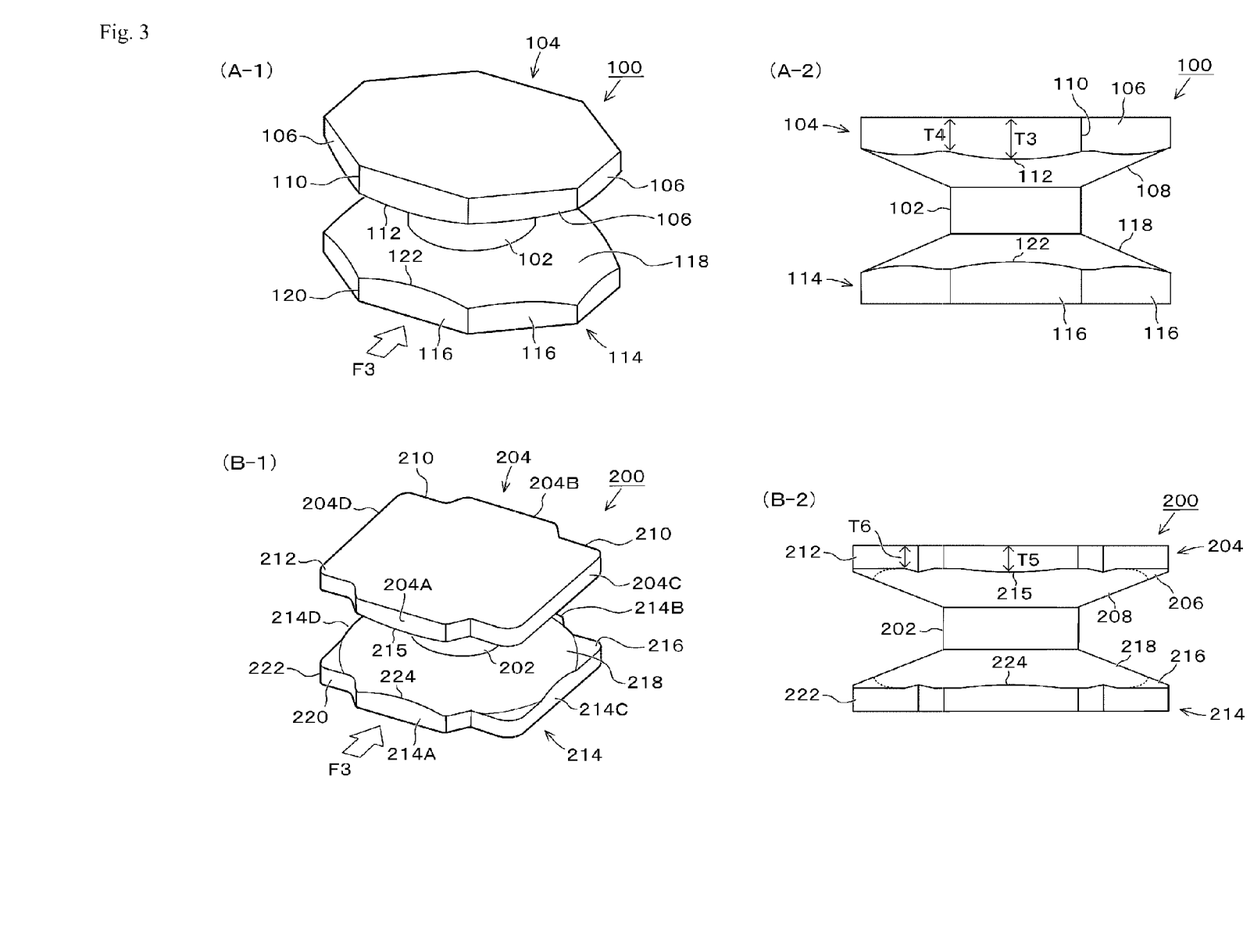
FIG. 3 illustrates variations of Example 1, where (A-1) and (B-1) are exterior perspective views, while (A-2) and (B-2) are side views of (A-1) and (B-1) from the direction of arrow F3, respectively.

First, Example 1 of the present invention is explained by referring to FIGS. 1 to 3. (A) in FIG. 1 is an external perspective view of the drum core in this example of the present invention, while (B) in FIG. 1 is a side view of (A) in FIG. 1 from the direction of F1. FIG. 2 is an illustration of the conditions of this example of the present invention and a comparative example where the winding wire is wound around the drum core, where (A-1) to (A-4) in FIG. 2 are side, bottom and perspective views of this example of the present invention, while (B-1) to (B-4) in FIG. 2 are views of the comparative example corresponding to (A-1) to (A-4) in FIG. 2, respectively. FIG. 3 is an illustration of variations of the example, the details of which are described later. The drum core 10 in this example of the present invention is a core for a wire-wound component and, as shown in (A) in FIG. 1 and (B) in FIG. 1, it has a pair of flange parts 14, 24 on both ends of an axis core 12 around which a winding wire 40 is wound. The material for making the drum core 10 may be ferrite, for example, but the material is not limited to ferrite, etc., and any alloyed magnetic material (such as Fe—Cr—Si alloy or Fe—Al—Si alloy) can be used.

The facing inner surfaces 16, 26 of the flange parts 14, 24 have tapered surfaces 18, 28 of roughly conical shape formed on them that make the interval of the inner surfaces 16, 26 increase toward the outer sides of the flange parts 14, 24. In the illustrated example, the flange parts 14, 24 have roughly a rectangular shape in plan view as seen from the axial direction of the axis core 12, where one flange part 14 has side faces 14A to 14D, while the other flange part 24 has side faces 24A to 24D (parts corresponding to some symbols are not illustrated). Of these, the long side face 14A of one flange part 14 contacts one tapered surface 18 along the side with a curved shape 20A that convexes roughly at the center. The side face 14C facing this side face 14A also has a similar curved shape (not illustrated). Similarly, the side along which the long side face 24A of the other flange part 24 contacts the other tapered surface 28, and the side along which another side face 24B (not illustrated) contacts the tapered surface 28, also have a curved shape 30A that convexes roughly at the center.

By providing the curved shapes 20A, 30A having the convex, the height T2 from the reference surfaces at the corners 15, 25 of the flange parts 14, 24 (here, the reference surface with respect to the flange part denoted by 14 indicates the bottom face when the top face in the condition shown in (A) in FIG. 1 and (B) in FIG. 1 is considered the bottom face) becomes lower than the height T1 from the reference surfaces at the convexes of the curved shapes 20A, 30A. By providing the height difference at the flange parts 14, 24 by means of the curved shapes 20A, 30A, riding of the winding wire 40 (wire) over the flange parts 14, 24 during winding can be prevented. Also, the angle α of the tapered surface denoted by 18 should be set to between 3° and 40°, or preferably between 5° and 30°, or more preferably between 10° and 20°, with respect to the surface crossing at right angles with the axial direction of the axis core 12, because this way, the winding wire 40 can be wound with extreme precision.

For example, (B-1) to (B-4) in FIG. 2 show a comparative example of a drum core 50 where a pair of flange parts 54, 58 of roughly rectangular shape are formed on both ends of an axis core 52, with tapered surfaces 56, 60 provided on the inner surface sides of the flange parts 54, 58. When a winding wire 40 is wound around the drum core 10 in this example of the present invention and drum core 50 in the comparative example, the winding wire 40 rides over the flange parts 54, 58 because there are no curved shapes like those in this example of the present invention on the side faces of the flange parts 54, 58 of the drum core 50 in the comparative example. As a result, the winding wire 40 projects from the outer edges of the flange parts 54, 58 and cannot be wound neatly, as shown in (B-1) and (B-2) in FIG. 2. On the other hand, the drum core 10 in Example 1 herein has curved shapes 20A, 30A that convex roughly at the center formed on the sides along which the long side faces 14A, 24A of the flange parts 14, 24 contact the tapered surfaces 18, 28, respectively, and as this structure repels the winding wire 40 toward the inner side at the convex part and prevents it from expanding toward the outer periphery, the wire can be wound with extreme precision along the shape of the drum core 10 without the winding wire 40 projecting from the outer edges of the flange parts 14, 24 as shown in (A-2) in FIG. 2. It should be noted that (A-2) and (B-2) in FIG. 2 correspond to plan views of (A-1) and (B-2) in FIG. 2 from the direction of arrow F2, or specifically from the bottom.

In addition, the drum core 50 in the comparative example, although having tapered surfaces 56, 60 between the flange parts 54, 58, the height from the reference surface (bottom face of the flange part denoted by 58 in this case) is the same at the corner 62 of the flange part denoted by 58 and at the rough center, for example, and therefore the winding wire 40 rides over the corner 62 as it is drawn out from near the corner 62 and the wire is damaged easily (refer to (B-3) in FIG. 2). On the other hand, the drum core 10 in this example of the present invention has the curved shapes 20A, 30A to provide a height difference between the height T2 from the reference surface at the corner 15 of the flange part denoted by 14 and the height T1 from the reference surface at the rough center, and consequently the winding wire 40 does not ride over the corner 25 during winding of the winding wire 40. Accordingly, the loads received by the winding wire 40 are reduced and damage can be prevented (refer to (A-3) in FIG. 2). (A-4) in FIG. 2 shows a condition where the winding wire 40 is wound around the drum core 10 in this example of the present invention, with the draw-out parts 40A, 40B drawn out. (B-4) in FIG. 2 shows a condition where the winding wire 40 is wound around the drum core 50 in the comparative example, with the draw-out parts 40A, 40B drawn out. When these two conditions are compared, it is clear that, by shaping the drum core in the way illustrated in this example of the present invention, the winding wire 40 can be wound with extreme precision and loads received by the winding wire 40 can be reduced to prevent its damage, which provides a wire-wound core having minimum winding disturbance and offering high reliability.

As explained above, the drum core 10 for a wire-wound component in Example 1 has a pair of flange parts 14, 24 on both ends of an axis core 12 around which a winding wire is wound, and formed on their facing inner surfaces 16, 26 are the tapered surfaces 18, 28 of roughly conical shape that make the interval of the facing inner surfaces 16, 26 increase toward the outer sides of the flange parts 14, 24. In addition, the flange parts 14, 24 have roughly a rectangular shape in plan view and the sides along which their long side faces 14A, 24A contact the tapered surfaces 18, 28 have the curved shapes 20A, 30A that convex roughly at the center, and these curved shapes 20A, 30A make the height T2 from the corners 15, 25 of the flange parts 14, 24 from the reference surface lower than the height T1 of the convex parts of the curved shapes 20A, 30A of the flange parts 14, 24 from the reference surface. This has the following effects:

(1) Since the angle at which to draw out the winding wire 40 and its tension during winding can be optimally adjusted with ease, the loads received by the winding wire during winding can be reduced and a wire-wound component can be fabricated that has minimum winding disturbance and offers high reliability.

(2) Since the pair of flange parts 14, 24 both have roughly a rectangular shape and the aforementioned curved shapes 20A, 30A are provided on the sides along which their long side faces contact the tapered surfaces 18, 28, the draw-out parts 40A, 40B of the winding wire 40 can be drawn out from either side of the flange parts 14, 24, which leads to an increased degree of freedom in design.

(3) By shaping the drum core 10 as mentioned above, the flange parts of drum core 10 make only point contact when contacting each other, without meshing and locking with each other.

<Variations>—Variations of this example of the present invention are explained by referring to FIG. 3.

(A-1) and (B-1) in FIG. 3 are external perspective views, while (A-2) and (B-2) in FIG. 3 are side views of (A-1) and (B-1) from the direction of arrow F3, respectively. The pair of flange parts 14, 24 of the drum core 10 shown in FIG. 1 and (A-1) to (A-4) in FIG. 2 both have roughly a rectangular shape in plan view as seen from the axial direction of the axis core 12, but it suffices that the flange parts have a polygonal shape in plan view. For example, the drum core 100 shown in (A-1) and (A-2) in FIG. 3 has a pair of flange parts 104, 114 on both ends of the axis core 102, with the flange parts 104, 114 both having an octagonal shape in plan view. Also, tapered surfaces 108, 118 of roughly conical shape are formed on the inner surface sides of the flange parts 104, 114, and all of the sides along which the tapered surfaces 108, 118 contact the side faces 106, 116 of the flange parts 104, 114 have curved shapes 112, 122. In this example, too, the height T4 of the corners 110, 120 of the flange parts 108, 118 from the reference surface (surface when the top face of the flange part denoted by 104 is considered the bottom face here) is lower than the height T3 of the convex parts of the rough centers of the curved shapes 112, 122 from the reference surface, and consequently the same effects achieved by the drum core denoted by 10 can be achieved.

Next, the drum core 200 shown in (B-1) and (B-2) in FIG. 3 is constituted with a pair of flange parts 204, 214 provided on both ends of the axis core 202, with the flange parts 204, 214 both having a square shape with its corners cut off in plan view. Also, tapered surfaces 208, 218 of roughly conical shape are formed on the inner surface 206, 216 sides of the flange parts 204, 214. In addition, a curved shape 215 is formed on all of the sides along which one tapered surface 208 contacts the side faces 204A to 204D of one flange part 204, while a curved shape 224 is also formed on all of the sides along which the other tapered surface 218 contacts the side faces 214A to 214D of the other flange part 214. In this example, too, the rough centers of the curved shapes 215, 224 are formed in a convex shape so that their height from the reference surface becomes higher than that of the corners 212, 222 from the reference surface. Furthermore, in this example, notched parts 210, 220 are provided at four corners of the corners 212, 222 to help determine the draw-out positions of the draw-out parts 40A, 40B of the winding wire 40. Accordingly, this drum core 200 not only has the same effects as those achieved with the aforementioned drum core 10, but it also has the effects of making it even easier to determine the draw-out positions of the winding wire 40 due to the notched parts 210, 220 provided at the corners 212, 222.

Example 2

Figure 4:
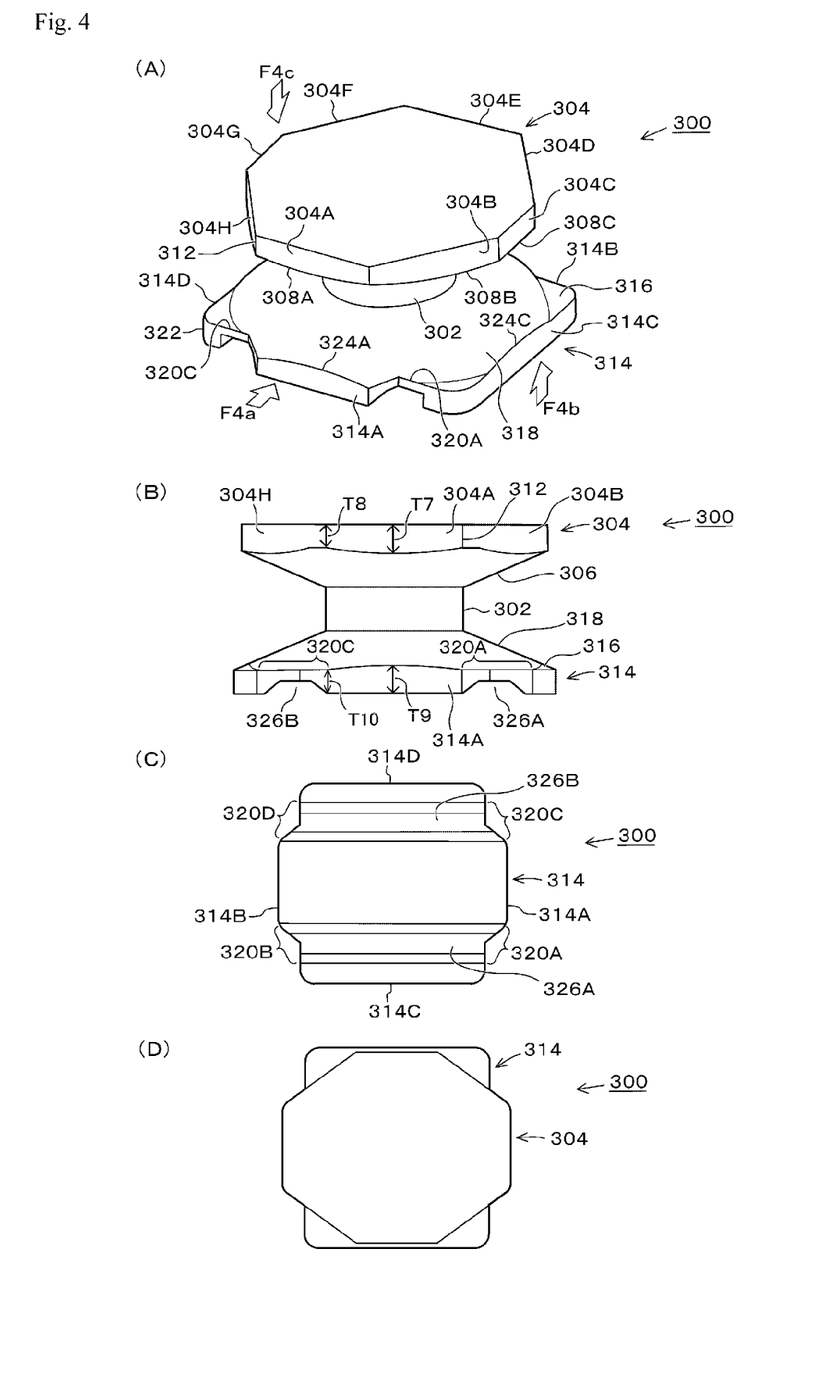
FIG. 4 represents Example 2 of the present invention, where (A) is an external perspective view of the drum core, (B) is a side view of (A) from the direction of arrow F4a, (C) is a plan view of (A) from the bottom (direction of arrow F4b), and (D) is a plan view of (A) from the top (direction of arrow F4c).
Figure 5:
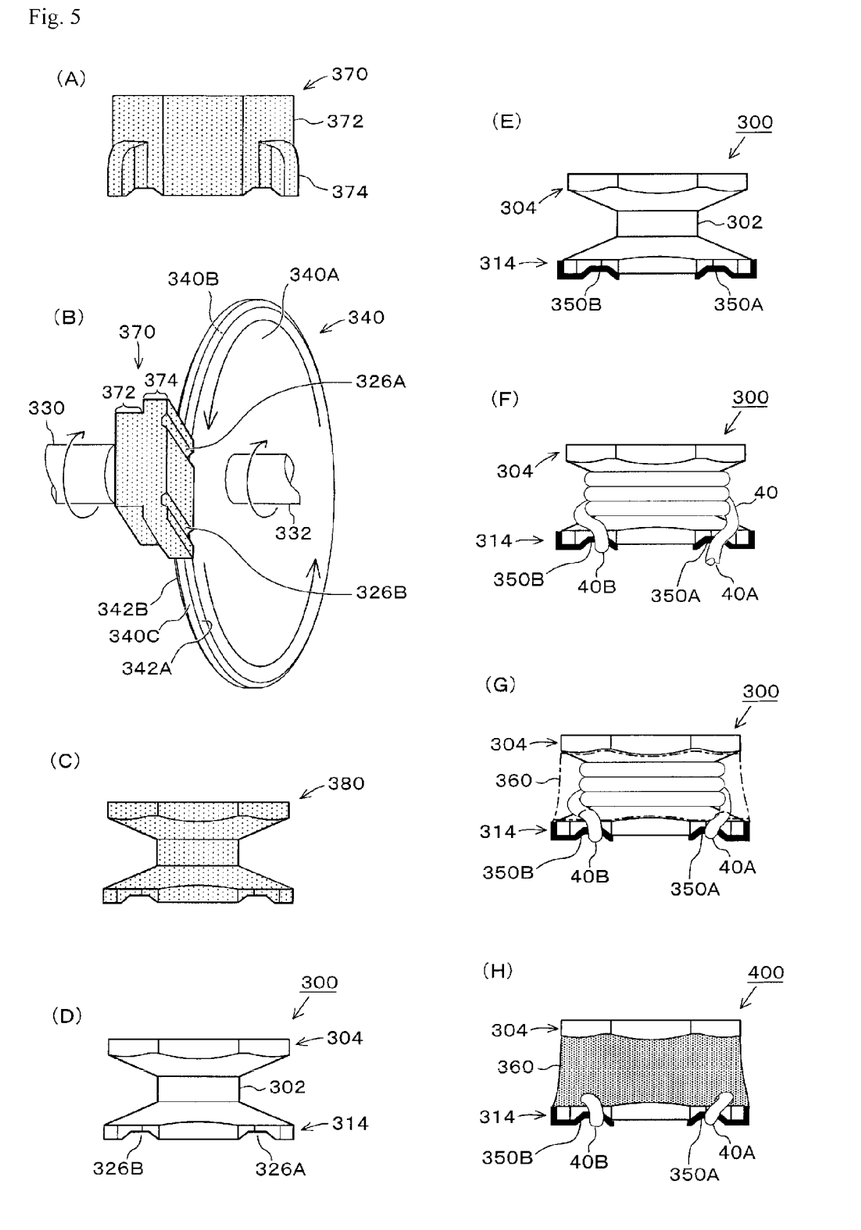
FIG. 5 illustrates the drum core in Example 2 and the manufacturing process of a wire-wound component using the drum core, showing (A) a core material, (B) a cutting process of the core material, (C) a machined work, (D) a drum core, (E) formation of electrodes, (F) a wire wound around the axis core and draw-out parts, (G) an outer sheath material covering a conductor part, and (H) a formed wire-wound component.
Figure 6:
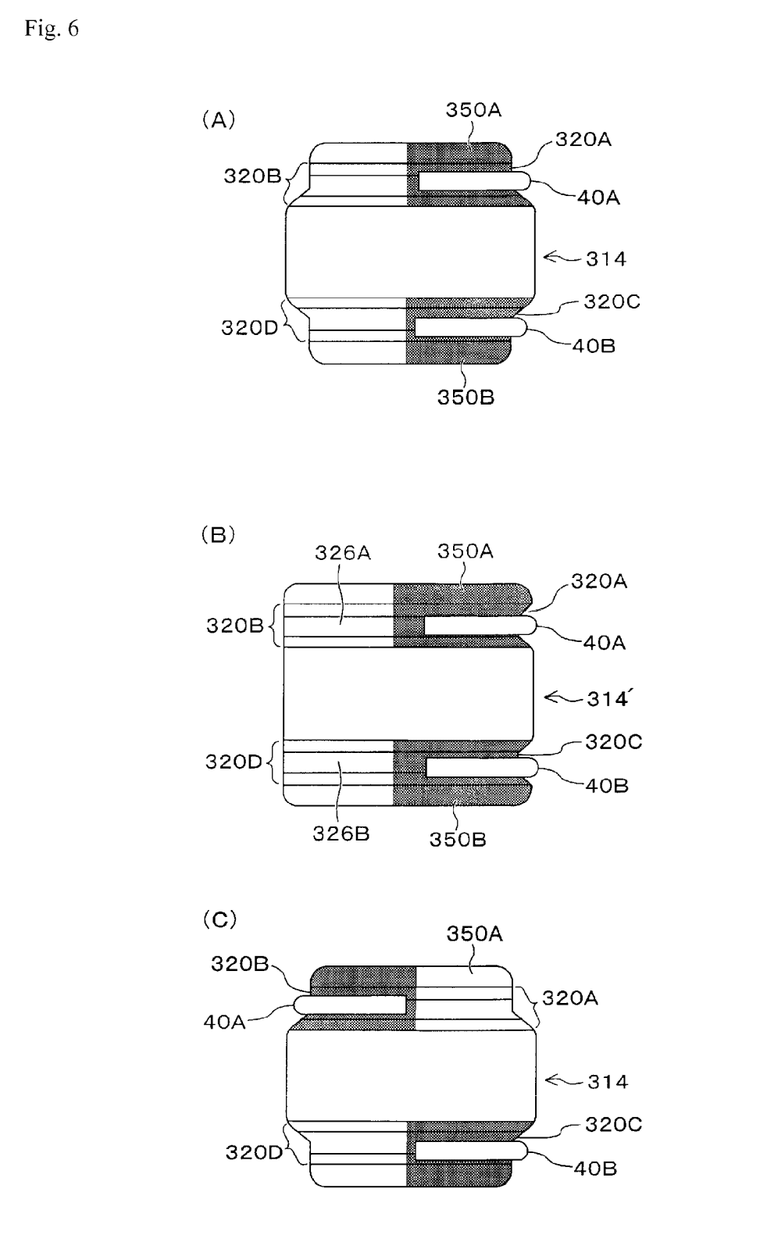
FIG. 6 illustrates draw-out parts of winding wires at the bottom of wire-wound components, where (A) is the draw-out part in Example 2, while (B) and (C) are the draw-out parts in variations.

Next, Example 2 of the present invention is explained by referring to FIGS. 4 to 6. In Example 1 and its variations described above, the pair of flange parts provided on both ends of the axis core had the same shape; however, flange parts of asymmetrical shapes may be provided on both ends of the axis core. In this example of the present invention, such drum core shape and its manufacturing method are explained. (A) in FIG. 4 is an external perspective view of the drum core; (B) in FIG. 4 is a side view of (A) from the direction of arrow F4a; (C) in FIG. 4 is a plan view of (A) from the bottom (direction of arrow F4b); and (D) in FIG. 4 is a plan view of (A) from the top (direction of arrow F4c). FIG. 5 shows the manufacturing process of the drum core in this example of the present invention and a wire-wound component using said core. FIG. 6 shows the draw-out part of the winding wire at the bottom side of the wire-wound component, where (A) in FIG. 6 indicates the draw-out part in Example 2, while (B) and (C) in FIG. 6 indicate the draw-out parts in variations.

As shown in (A) and (B) in FIG. 4, the drum core 300 in this example of the present invention is constituted with a pair of flange parts 304, 314 provided on both ends of an axis core 302, where one flange part 304 has roughly an octagonal shape in plan view, while the other flange part 314 has a square shape with its corners cut off in plan view. In addition, tapered surfaces 306, 318 of roughly conical shape are formed on the inner surface sides of the flange parts 304, 314. On the side of one flange part 304 mentioned above, curved shapes 308A to 308H are formed on all of the sides along which the tapered surface denoted by 306 contacts eight side faces 304A to 304H (parts corresponding to some symbols are not illustrated). The height T7 of the rough centers of the curved shapes 308A to 308H from the reference surface (surface when the top face of the flange part denoted by 304 is considered the bottom face here) is higher than the height T8 of the corner 312 from the reference surface.

On the side of the other flange part 314, curved shapes 324A to 324D are formed on all of the sides along which the tapered surface denoted by 318 contacts four side faces 314A to 314D. Also, the height T9 of the rough centers of the curved shapes 324A to 324D from the reference surface (bottom face of the flange part denoted by 314 here) is higher than the height T10 of the corner 322 from the reference surface. Furthermore, this flange part 314 has notched parts 320A to 320D provided at four corners of the corner 322 to help determine the draw-out positions of the draw-out parts 40A, 40B of the winding wire 40. Also on the back side of the flange part 314, a groove 326A is formed in a manner connecting the notched parts 320A and 320B, while a groove 326B is formed in a manner connecting the notched parts 320C and 320D as shown in (C) in FIG. 4. Accordingly, the draw-out part 40A or 40B of the winding wire 40 drawn out from any of the notched parts 320A to 320D is stored in the grooves 326A or 326B on the back side (or outer side) of the flange part 314 and then connected to the electrode.

Next, an example of the manufacturing method of the drum core 300 in this example of the present invention and a wire-wound component 400 utilizing said core is explained by referring to FIG. 5. First, a molding that gives a core material 370 shown in (A) is prepared. This core material 370 is constituted by an octagonal part 372 corresponding to what eventually becomes an octagonal flange part 304, and a square part 374 corresponding to a square flange part 314 having notched parts 320A to 320D, and a pair of grooves 326A, 326B shown in (C) in FIG. 4 above are formed on the back side of the square part 374 beforehand. The core material 370 of this shape is cut using a diamond wheel 340 as shown in (B) in FIG. 5. While being cut, the side of the octagonal part 372 of core material 370 is supported with a shaft 330, and side of the square part 374 supported with another shaft 332, to turn the core material 370 using a rotational device (not illustrated). Then, the diamond wheel 340 is turned with a drive mechanism (not illustrated) and pressed against the core material 370 to cut the material.

The diamond wheel 340 has tapered surfaces 342A, 342B on the edge 340C sides of both of its main sides 340A, 340B. By cutting with the diamond wheel 340 having the tapered surfaces 342A, 342B, an axis core 302, flange parts 304, 314 and the aforementioned tapered surfaces 306, 318 can be formed. By shaping the tapered surfaces 306, 318 of roughly conical shape until their edges cross with the side faces of the flange parts 304, 314, curved shapes 314A to 314H, 324A to 324D having the aforementioned convex parts can be formed ((C) in FIG. 5). Alternatively, tapered surfaces 306, 318 of roughly conical shape may be formed first and then the side faces of the flange parts 304, 314 may be cut roughly in parallel with the axis core 302 to form the curved shapes 314A to 314H, 324A to 324D on the sides along which the cut sections contact the tapered surfaces 306, 318 ((C) in FIG. 5).

Next, the machined work 380 completing the aforementioned cutting is sintered to obtain the drum core 300 in this example of the present invention ((D) in FIG. 5). Next, as shown in (E) in FIG. 5, electrodes 350A, 350B are formed on the back side of the flange part 314 in a manner covering the grooves 326A, 326B. The electrodes 350A, 350B are formed by plating, for example. Next, as shown in (F) in FIG. 5, the winding wire 40 is wound around the axis core 302, after which the draw-out parts 40A, 40B are drawn out from the notched parts 320A, 320C to the back side of the flange part 314 and then joined to the electrodes 350A, 350B formed inside the grooves 326A, 326B as shown in (A) in FIG. 6. Next, as shown in (G) in FIG. 5, outer sheath material 360 is applied to cover the conductor formed by winding the winding wire 40, and the formed wire-wound component 400 ((H) in FIG. 5) is mounted on an electronic device, etc. It should be noted that the benefits of winding the winding wire 40 around the drum core 300 in this example of the present invention are the same as those achieved in Example 1 and its variations mentioned above. Also, the aforementioned method of drawing out the winding wire 40 is only one example and one draw-out part 40A may be drawn out from the notched part 320B side, with the other draw-out part 40B drawn out from the notch 320C side. Alternatively, just like the flange part 314' shown in (B) in FIG. 6, only the notched parts 320A, 320C may be provided and the winding wire 40 may be drawn out at these positions.

It should be noted that the present invention is not limited to the aforementioned examples and various changes may be added to the extent that they do not deviate from the purpose of the present invention. For example, the present invention also covers the following:

(1) The shapes and dimensions shown in the examples of the present invention are only examples and may be changed as deemed necessary and appropriate. For example, the pair of flange parts both have a polygonal shape in plan view in Example 1 and Example 2, but as long as the flange part from which the winding wire 40 is drawn out has a polygonal shape, the other flange part may not have a polygonal shape in plan view. In addition, as for the curved shapes formed on the sides of the polygonal flange part, it suffices to form a curved shape only on at least one side of the polygonal shape.

(2) The materials for a drum core shown in the examples of the present invention are only examples and any of the various known materials may be utilized.

(3) The axis core had a roughly circular shape in section view in the examples of the present invention, but it can have a polygonal shape, oval shape, etc.

(4) An optimal range of inclination of the tapered surfaces 18, 28 was set to between 10° and 20° in Example 1, but this is also an example and the design can be changed within the range where similar effects can be achieved (3° to 40°). In addition, the inclination of the tapered surface provided on one of the facing flange parts may be different from the inclination of the tapered surface provided on the other flange part.

(5) The tapered surfaces provided on the inner surface sides of the flanges have roughly a conical shape in the examples of the present invention, but their shape is not limited to the foregoing.

(6) Suitable applications of the core for a wire-wound component proposed by the present invention include wound inductors and other wire-wound components, but its applications are not limited to the foregoing and the present invention can be applied widely to transformers, common mode choke coils, and so on.

According to the present invention, tapered surfaces are provided on the inner surfaces of a pair of facing flange parts provided on both ends of an axis core around which a winding wire is wound in such a way that the interval of the facing inner surfaces increases toward the outer sides of the flange parts, where at least one flange part has a polygonal shape as seen from the axial direction of the axis core and the side along which at least one side face of the polygonal flange part contacts the tapered surface has a curved shape that convexes roughly at the center, and the height of the corner of the flange part at the end of the curved shape from the reference surface is lower than that of the convex part of the curved shape from the reference surface. As a result, the angle at which to draw out the winding wire and its tension during winding can be adjusted optimally with ease and the loads received by the wire during winding can be reduced, and consequently the core thus obtained can be applied for wire-wound components. It is particularly suitable for low-height wire-wound inductors.

In the present disclosure where conditions and/or structures are not specified, a skilled artisan in the art can readily provide such conditions and/or structures, in view of the present disclosure, as a matter of routine experimentation. Also, in the present disclosure including the examples described above, any ranges applied in some embodiments may include or exclude the lower and/or upper endpoints, and any values of variables indicated may refer to precise values or approximate values and include equivalents, and may refer to average, median, representative, majority, etc. in some embodiments. Further, in this disclosure, "a" may refer to a species or a genus including multiple species, and "the invention" or "the present invention" may refer to at least one of the embodiments or aspects explicitly, necessarily, or inherently disclosed herein. In this disclosure, any defined meanings do not necessarily exclude ordinary and customary meanings in some embodiments.

The present application claims priority to Japanese Patent Application No. 2011-169655, filed Aug. 2, 2011, the disclosure of which is incorporated herein by reference in its entirety.

It will be understood by those of skill in the art that numerous and various modifications can be made without departing from the spirit of the present invention. Therefore, it should be clearly understood that the forms of the present invention are illustrative only and are not intended to limit the scope of the present invention.

We claim:

1. A wire-wound component having a structure comprising:
    a drum core having an axis core and a pair of flange parts provided on both ends of the axis core, said pair of flange parts respectively having outer side peripheries parallel to an axis of the axis core and respectively having inner surfaces facing each other, wherein:
        tapered parts are provided respectively on the facing inner surfaces of the pair of flange parts, constituting tapered surfaces such that the distance along a direction parallel to the axis of the axis core between the tapered surfaces of the respective flange parts facing each other increases radially outwardly toward the outer side peripheries of the flange parts from the axis core,
        at least one of the flange parts has a polygonal shape in plan view as viewed from the axial direction of the axis core, said polygonal shape having sides such that a line passing through a center of each side and a center of the axis core is perpendicular to the side, and
        at least one outer side periphery of the polygonal flange part as one side of the polygonal shape meets the tapered surface along a curved line in front view with respect to the at least one outer side periphery so that the at least one outer side periphery of the polygonal flange part has a convex shape that convexes approximately at the center of the curved line toward the other flange part in front view with respect to the at least one outer side periphery as viewed from a direction perpendicular to the axial direction;
    a winding wire wound circumferentially around the axis of the axis core of the drum core on and in contact with the axis core as well as on and in contact with the tapered surface of the flange part where the curved shape has been formed, wherein each end of the winding wire is drawn out from near a corner of said flange part where the curved shape has been formed; and
    electrodes to which the ends of the winding wire are connected, respectively, only at the flange part from which the ends of the winding wire are drawn, each electrode formed along and in contact with an outer surface of the flange part.

2. A wire-wound component according to claim 1, wherein the tapered surface is shaped as approximately conical such that the side along which the tapered surface meets the side face of the polygonal flange part provides the curved shape.

3. A wire-wound component according to claim 2, wherein the angle of the tapered surface relative to a plane perpendicular to the axial direction of the axis core is between 3° and 40°.

4. A wire-wound component according to claim 3, wherein notched parts are provided at corners of the flange parts to draw out the winding wire.

5. A wire-wound component according to claim 2, wherein notched parts are provided at corners of the flange parts to draw out the winding wire.

6. A wire-wound component according to claim 1, wherein the angle of the tapered surface relative to a plane perpendicular to the axial direction of the axis core is between 3° and 40°.

7. A wire-wound component according to claim 6, wherein notched parts are provided at corners of the flange parts to draw out the winding wire.

8. A wire-wound component according to claim 1, wherein notched parts are provided at corners of the flange parts to draw out the winding wire.

9. A wire-wound component according to claim 1, further comprising an outer sheath formed on the winding wire.

10. A wire-wound component according to claim 1, wherein both flange parts have the curved shape sides facing the same direction, and no wound portion of the winding wire protrudes from the curved shape sides as viewed from a direction perpendicular to the axis of the axis core.

11. A wire-wound component according to claim 1, wherein the electrodes are formed on the outer surface of the flange part opposite to the tapered surface.

12. A wire-wound component according to claim 1, wherein the core is made of ferrite or an alloyed magnetic material.

13. A wire-wound component according to claim 1, wherein the wound wire is covered with an outer sheath material.

14. A wire-wound component according to claim 1, which is a wound inductor, transformer, or common mode choke coil.

* * * * *